United States Patent [19]

Khatib

[11] Patent Number: 5,849,983
[45] Date of Patent: Dec. 15, 1998

[54] PREVENTION OF SHEARING OF HYDROCARBON DROPLETS TO AEROSOL SIZES

[75] Inventor: Zara Ibrahim Khatib, Bellaire, Tex.

[73] Assignee: Shell Oil Company, Houston, Tex.

[21] Appl. No.: 643,724

[22] Filed: May 6, 1996

Related U.S. Application Data

[60] Provisional application No. 60/011,801 Feb. 16, 1996.
[51] Int. Cl.⁶ .............................. C07C 7/00; C07C 7/10; B01D 47/00
[52] U.S. Cl. ..................... 585/867; 585/833; 585/864; 95/237; 55/228
[58] Field of Search ................. 585/833, 864, 585/867; 95/237; 55/228

[56] References Cited

U.S. PATENT DOCUMENTS

| | | | |
|---|---|---|---|
| 3,996,023 | 12/1976 | Osmond et al. | 44/62 |
| 4,070,165 | 1/1978 | Colton . | |
| 4,758,354 | 7/1988 | O'Mara et al. | 210/728 |
| 4,863,495 | 9/1989 | Rafson . | |
| 5,378,264 | 1/1995 | Wei et al. . | |

FOREIGN PATENT DOCUMENTS

| | | |
|---|---|---|
| 514256 | 10/1952 | Belgium . |
| 225800 | 7/1985 | Czech Rep. . |
| 78998 | 5/1983 | European Pat. Off. . |
| 112053 | 6/1984 | European Pat. Off. . |
| 0246826 | 11/1987 | European Pat. Off. . |
| 0355317 | 7/1988 | European Pat. Off. . |
| 87/03516 | 6/1987 | WIPO . |
| 96/01678 | 1/1996 | WIPO . |

OTHER PUBLICATIONS

European Search Report of 27 May 1997.

*Primary Examiner*—Glenn Caldarola
*Assistant Examiner*—In Suk Bullock
*Attorney, Agent, or Firm*—Frederik Marlowe

[57] ABSTRACT

This invention pertains to addition of polyisobutylene to a predominantly gaseous stream in a process for preventing the shearing of hydrocarbon droplets in the stream to aerosol sizes. It is difficult to remove droplets of aerosol sizes from gaseous streams with demisters, scrubbers, filters or the like. Generally, aerosol size droplets are created when a predominantly gaseous stream containing some liquid is passed at relatively high velocity through an orifice, valve, bend, tee, choke or the like, or subjected to compression by a turbine. The addition of polyisobutylene would improve the separation efficiency of the demisters, scrubbers, filters or the like. In addition, when the demister pads or compressor has its blades coated with polyisobutylene, drag on the droplets is reduced, resulting in less shearing of the droplets to aerosol sizes. This in turn would result in minimum dissemination of droplets and less wear on the compressor's blades.

17 Claims, 6 Drawing Sheets

PREVENTION OF SHEARING OF HYDROCARBON DROPLETS TO AEROSOL SIZES

This application claims the benefit of the filing of U.S. Provisional Patent Application 60/011,801, filed Feb. 16, 1996, relating to the prevention of shearing of hydrocarbon droplets.

BACKGROUND OF THE INVENTION

1. Field of the Invention

This invention pertains to a process for preventing the shearing of hydrocarbon droplets to aerosol sizes in predominantly gaseous streams. It is difficult to remove droplets of aerosol sizes from gaseous streams with demisters, scrubbers, filters or the like. Generally, aerosol size droplets are created when a predominantly gaseous stream containing some liquid is passed at relatively high velocity through an orifice, valve, bend, tee, choke or the like, or subjected to compression through turbines.

2. Prior Art

The prior art (U.S. Pat. No. 3,996,023, EP 78998A, CS 225,800 B Czech, U.S. Pat. No. 4,758,354 and EP 112053) relates to treating liquid hydrocarbons, not to treating a predominantly gaseous stream as in the present invention, except for EP 112053 which discloses scrubbing exhaust gases or waste air from a manufacturing process, for example, rolling of metal, and utilizing a composition which may include polyisobutene.

SUMMARY OF THE INVENTION

A method has now been discovered for facilitating the removal of a hydrocarbon mist from a gaseous stream. The method comprises mixing the mist in the gaseous stream with an agent functional to substantially prevent shearing of the mist to smaller particle sizes which are difficult to remove from the gaseous stream in separation apparatus. The agent is preferably polyisobutylene which is mixed with a diluent such as diesel oil. More preferably, the agent is atomized and then sprayed into the gaseous stream in a direction countercurrent to the flow of the gaseous stream. Most preferably, the agent is sprayed through an elongated spray nozzle, or the like, having orifices pointed substantially in one direction to facilitate mixing through countercurrent spraying. Shearing of the mist to smaller particle sizes occurs in turbine compression as well as in flow of the mist through orifices. Typically, the separation apparatus is a demister followed by a coalescing filter or a scrubber.

A preferred use for the invention is with a production stream containing predominantly gas, some oil, moisture and hydrogen sulfide which is treated to remove substantially all of the oil, then treated with said agent to prevent shearing of the remaining oil to smaller particle sizes in the following shearing steps that the gas is subjected to such as compression, scrubbing or filtering to remove the remaining oil, and then sent with the hydrogen sulfide to a process for oxidizing the sulfide to elemental sulfur.

Another preferred use of the invention is in the treatment of a production stream from an offshore well containing predominantly gas with some oil which is treated, first to remove most of the oil, and then mixing the remaining stream with an agent such as polyisobutylene to prevent shearing of oil droplets to aerosol sizes. Then the production stream is filtered or scrubbed to remove the remaining oil. The scrubber/filter surfaces are preferably coated with polyisobutylene which acts as a drag reducer to the impinging droplets thereby minimizing their dissemination and increasing their coalescence and drainage. Another preferred use of the invention is in the treatment of fuel gas upstream of compressors to assist in separating the liquid hydrocarbon through scrubbers or filters.

DESCRIPTION OF PREFERRED EMBODIMENTS

The present invention is directed to separating a hydrocarbon mist from a gaseous stream. This is very difficult where some or all of the mist is of aerosol size (less than one micron), which passes through a conventional filter or scrubber. Accordingly, it is necessary to prevent the mist from being degraded to aerosol sizes. Degradation primarily occurs in the shearing steps of two operations: passing the mist through a constriction at high velocity or subjecting the mist to compression, which entails flow of the gas through compression stages at high velocity. Hence, the present invention adds an agent to the mist which substantially prevents the occurrence of degradation during the shearing steps or during the impingement of droplets on surfaces. Also, the agent will coat the surfaces which it contacts, and condensate droplets will bond to the agent located on the surfaces and then further droplets will collect to form larger droplets which will then drain. The agent is a high molecular weight polymer, preferably polyisobutylene which is mixed with a diluent such as diesel oil, crude oil, condensate, toluene, xylene, paraffinic oil, or the like. The agent is preferably used at a concentration of 0.01–7% v active ingredient in liquid hydrocarbon. The agent preferably is sprayed in a mist form into the gaseous stream in a direction countercurrent to the flow of the gaseous stream. More preferably, the agent is sprayed through an elongated spray nozzle, or the like, having orifices pointed upstream. The chemical would collide with the hydrocarbon droplets and prevent them from further shearing into smaller particle sizes before their being separated in a demister, coalescing filter or a scrubber.

Figure 1:
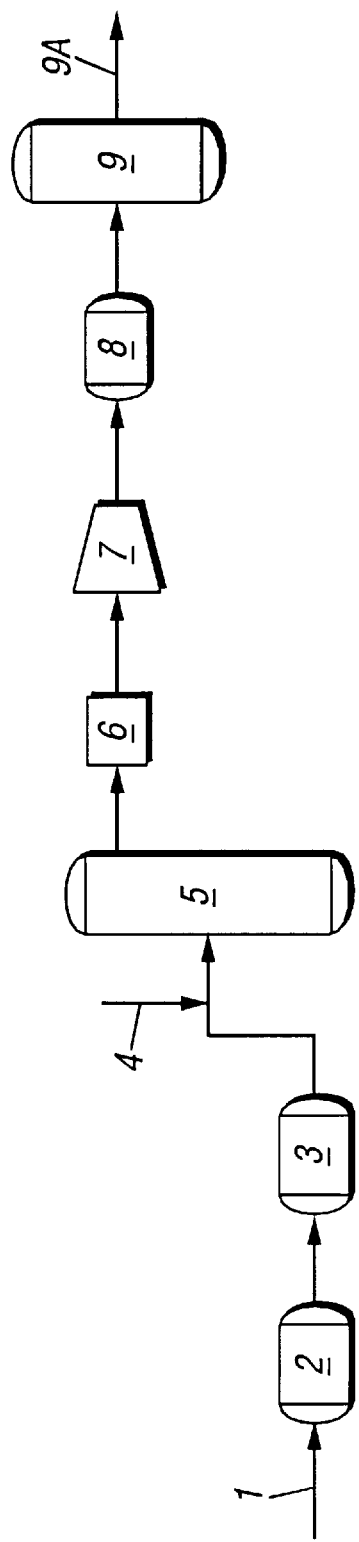
FIG. 1 is a schematic view of Assignee's Denver City Gas Compression Facility.

A preferred use for the invention is with a production stream containing predominantly gas, some oil and hydrogen sulfide which is treated to remove substantially all of the oil, then treated with said agent to prevent shearing of the remaining oil to smaller particle sizes in the following shearing steps that the gas is subjected to such as compression, scrubbing or filtering to remove the remaining oil, and then sent with the hydrogen sulfide to a process for oxidizing the sulfide to elemental sulfur. FIG. 1 shows this type of arrangement, assignee's Denver City gas compression facilities. Production gas stream 1, for example 100

MMSCFD, is passed to a gas/liquid separator 2 and then to an inlet scrubber 3 to get rid of a substantial part of its oil and water. The stream coming out of inlet scrubber 3 is for example at approximately 85° F. and 150 psi. An injection via line 4 of polyisobutylene is made into the outlet stream of the inlet scrubber 3. The gas stream 1 is then passed through knockout vessel 5 which has internal demisting vanes for further removing oil, then to a fin fan cooler 6, and then through a compressor 7. Coating of the demister vanes with the polyisobutylene functions to reduce the drag on the droplets, thereby reducing their dissemination and increasing the potential for droplets coalescing. At this stage the stream 1 is, for example, at a temperature of approximately 100° F. and a pressure of approximately 300 psi. Then the stream 1 is passed through filter vessel 8, being preferably of about five micron size, and finally to a coalescer filter 9. It is in compressor 7 that mists would be degraded to aerosol sizes but for the present invention. Coating of the vanes of the compressor with polyisobutylene functions to reduce the drag on droplets passing through the compressor, thereby reducing the formation of aerosol droplets. Stream 9A is passed to a unit (not shown) for chemical treatment to oxidize sulfides (hydrogen sulfide) contained in the stream to elemental sulfur. In the Denver City process, described hereinabove, oil carryover is about 10–20 BOPD without the polyisobutylene chemical of this invention in use. With the polyisobutylene in use in the Denver City process at a concentration of 20 to 100 ppm, the oil carryover was reduced to nondetectable quantities.

Figure 2:
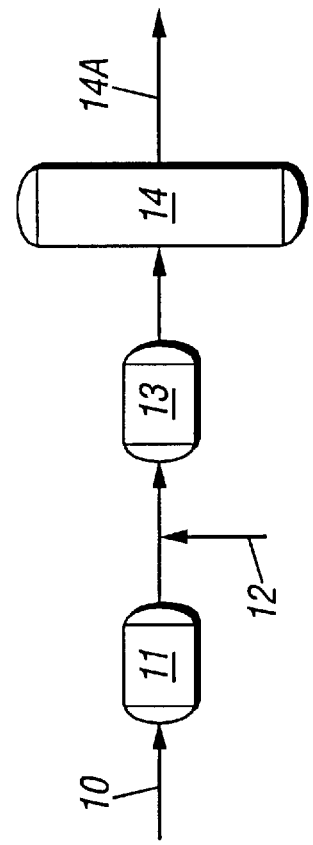
FIG. 2 is a schematic view of Assignee's Yellow Hammer Gas Plant.

Another application of the invention is shown in FIG. 2 in the treatment of a gas plant stream, in assignee's Yellow Hammer Gas Plant. Gas production stream 10, for example from 160 to 230 MMSCFD, is first passed to a gas/liquid separator 11 where a substantial majority of the liquid in stream 10 is separated. The stream exiting the separator is at high pressure, for example 1000psi. Chemical injection into this stream, preferably polyisobutylene, is made via line 12. The gas production stream is then admitted to a high pressure scrubber 13. The stream exiting scrubber 13 is at a temperature of, for example, 100° F. and is admitted to a coalescer filter 14. The filter of this unit preferably has a fineness of 0.3 to 1 micron. Polyisobutylene coating the interior surfaces of scrubber 13 and filter 14 functions to reduce drag of droplets passing therethrough, thereby reducing the formation of aerosol size droplets (which are generally difficult to separate) and enhancing their coalescence and drainage. Stream 14A exiting filter 14 is relatively free of droplets and is passed to aqueous MDA treatment (methyl diethanol amine) plus a Claus sulfur plant plus triethylene glycol gas dehydration. In the Yellow Hammer process, described hereinabove, with use of the polyisobutylene chemical at a concentration of 20–100 ppm, oil carryover was reduced from 10–20 BPD to less than 0.2 BPD.

Figure 3:
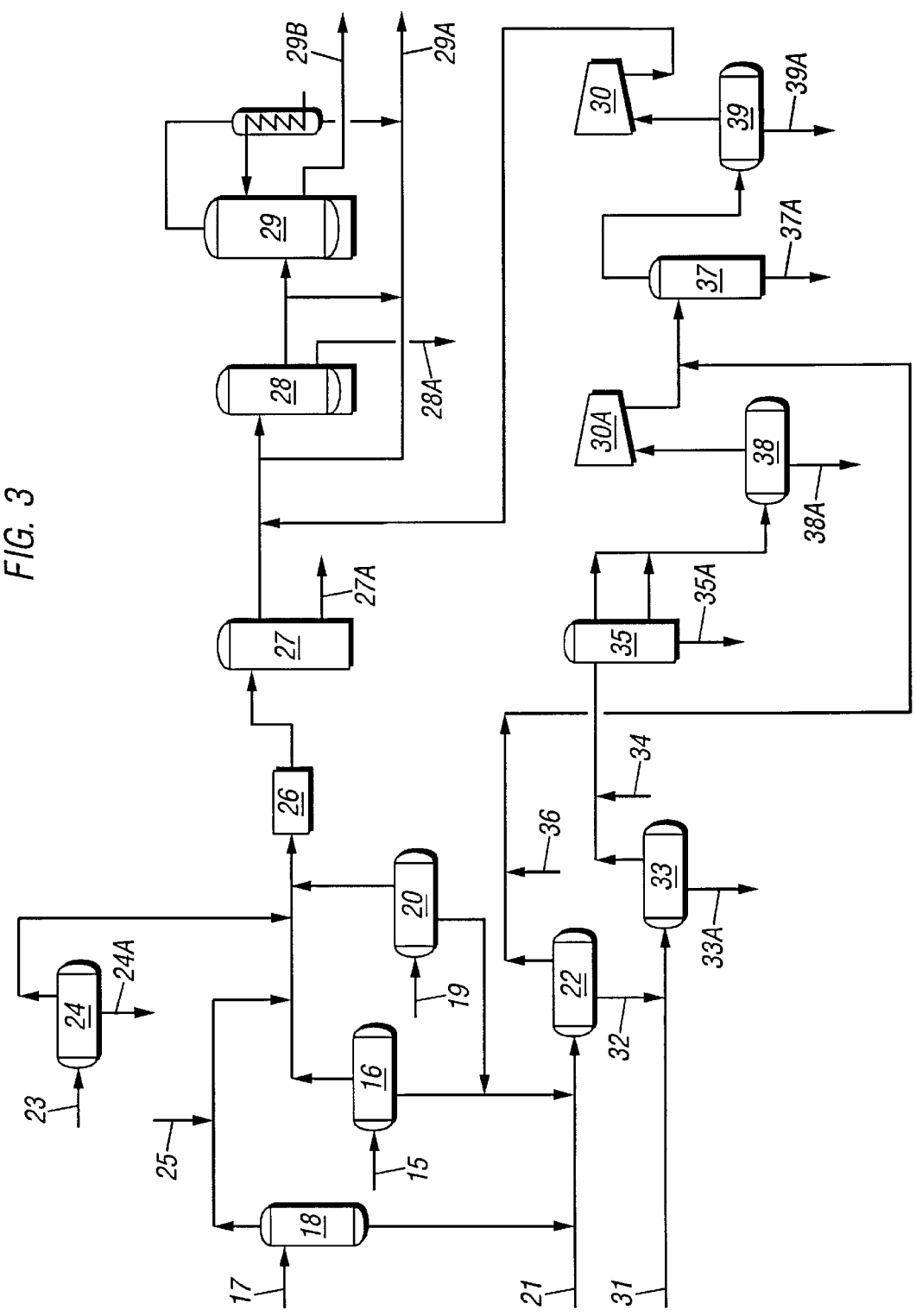
FIG. 3 is a schematic view of Assignee's Gas Handling Facilities at Auger Platform.

Still another use of the invention is in the treatment of a production stream from an offshore well containing predominantly gas with some oil which is treated, first to remove most of the oil, and then mixing the remaining stream with an agent such as polyisobutylene to prevent shearing of the oil droplets to aerosol sizes. Then the production stream is filtered or scrubbed to remove the remaining oil before it is dehydrated in the glycol contractor FIG. 3 shows this type of arrangement, assignee's Auger Platform. High pressure gas from wells is brought via line 15, to a high pressure gas separator 16. High pressure oil from wells is brought via line 17 to a high pressure oil separator 18 and via line 19 to high pressure oil separator 20. Stream 15 has a lower oil to gas ratio than stream 17. Intermediate pressure production 21 from wells is combined with bottom streams from vessels 16, 18 and 19 and brought to intermediate pressure separator 22. A stream 23 from the wells goes to a test separator 24 where it is learned how best to treat the stream in the process. Stream 24A, an oil-rich stream from test separator 24, is recycled to an upstream separator such as intermediate pressure separator 22. The chemical agent of the present invention, polyisobutylene, is injected via line 25 into the overhead stream from vessel 18. Overhead streams from vessels 16 (25.6 MMSCFPD), 18 (59.4 MMSCFPD), 20 (28.9 MMSCFPD) and 24 are then combined into a stream at 1800 psi and sent to cooler 26. (The flowrates and pressures listed herein are intended as illustrative and not as limiting.) From the cooler a stream is sent to cyclone separator 27. A stream (147 MMSCFPD) from the cyclone separator is combined with a stream (50 MMSCFD) from a compressor (described hereinafter) at a pressure of 1796 psi. The combined stream from the compressor go to a high pressure gas filter separator 28. A stream from vessel 28 is sent to glycol contractor 29. Glycol from the contractor is sent to glycol reconcentration 29B, and an overhead stream from the contractor along with streams from vessels 27, 28 and compressor 30 form dry gas 29A sent to sales.

Referring back now to the initial separation steps of this embodiment, a stream 31 from low pressure production is combined with a bottom stream 32 from the intermediate pressure separator 22, and the resulting stream is taken to a low pressure separator 33, and an overhead stream (14 MMSCFPD) is taken from separator 33 and combined via line 34 with polyisobutylene which is then injected into discharge scrubber 35. An oil-rich bottom stream 34A is sent to an upstream separator such as the low pressure separator 33. An overhead stream (26 MMSCFPD) is taken from intermediate pressure separator 22, and combined with polyisobutylene via line 36, and the resulting stream is taken to second stage discharge scrubber 37. A bottom stream is taken from discharge scrubber 35 to first stage suction scrubber 38 and then to compressor 30A. A discharge stream from compressor 30A at 665 psi is merged with the overhead stream from intermediate pressure separator 22, which is taken to second stage scrubber 37 as above noted. An overhead stream is taken from scrubber 37 and passed to first stage suction scrubber 39 and then to compressor 30. As already noted, a discharge stream (46.9 MMSCFPD) is taken from compressor 30 and merged with a stream from cyclone separator 27. Oil-rich bottom streams 35A, 38A, 37A and 39A are preferably recycled to an upstream separator such as intermediate pressure separator 22. The polyisobutylene admitted via lines 34 and 36 assist in removing the liquid hydrocarbon which generally ends up in 30 and 30A.

Figure 4:
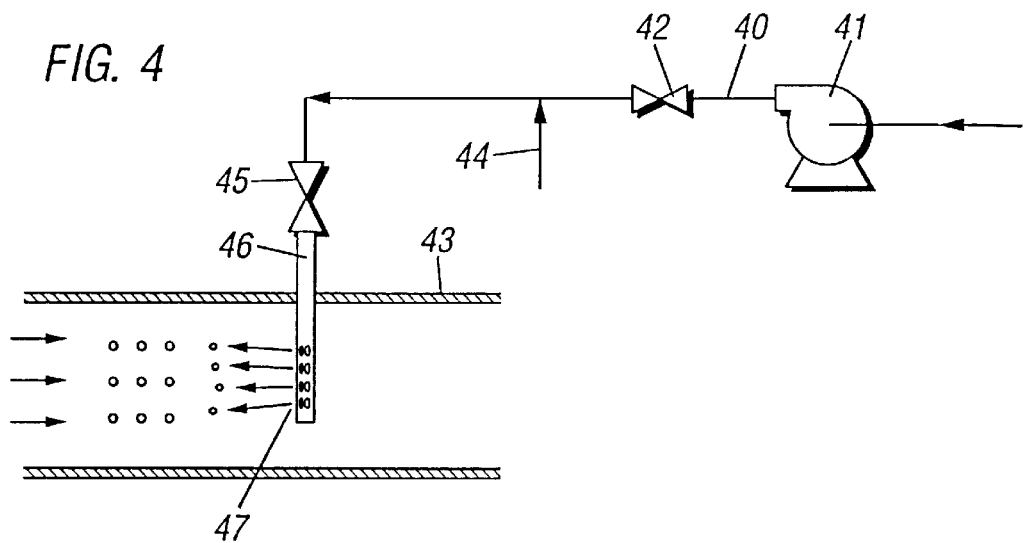
FIG. 4 is a schematic view of atomization apparatus.

FIG. 4 shows how the chemical, preferably polyisobutylene, is atomized for introduction into the stream being treated. The polyisobutylene together with a diluent as described herein, is injected into line 40 by chemical pump 41. A check valve 42 prevents the backflow of the chemical as high pressure gas, 50 to 100 psi higher than in line 43, is injected into line 40 via line 44 to atomize and deliver it to line 43 in a mist form. The polyisobutylene, diluent, and gas pass through a second check valve 45, into a nozzle 46, and then into stream 43 via nozzles 47 which are pointed upstream to ensure good mixing.

Figure 5:
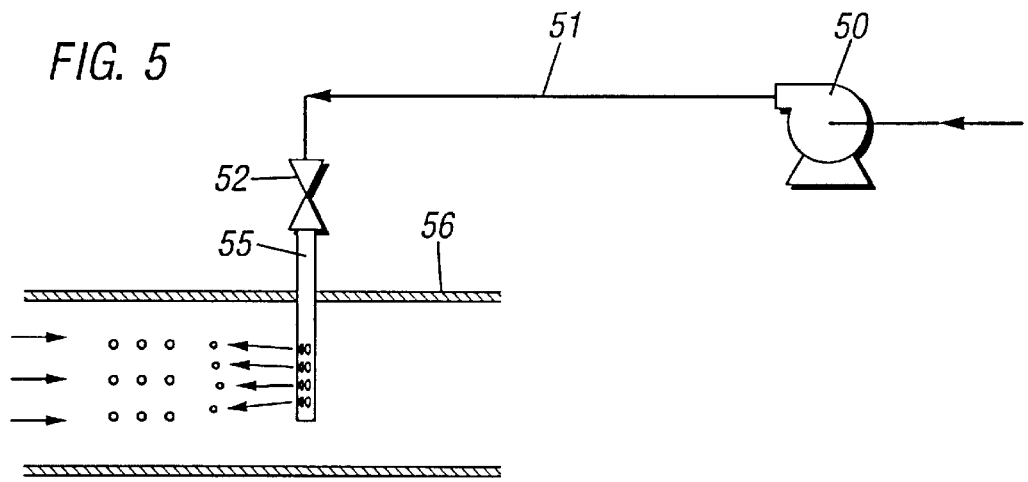
FIG. 5 is a schematic view of alternative atomization apparatus.

In FIG. 5 a second embodiment of an atomizer nozzle is shown. Pump 50 injects a mixture of polyisobutylene and diluent via line 51, through check valve 52 and nozzle 55, and into line 56. Again orifices in the nozzle are pointed upstream to ensure good mixing.

Figure 6:
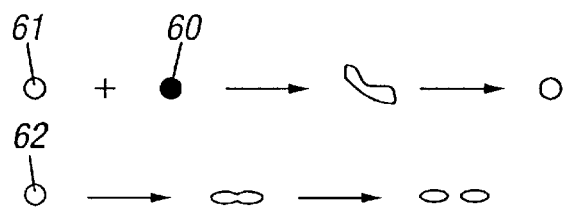
FIG. 6 is a description of the mechanism by which droplet size is kept intact.

FIG. 6 compares the shearing effects on two droplets of oil 61 and 62, one of which is in the presence of polyisobutylene. The polyisobutylene coats droplet 61 which distorts under shear but resumes its shape after the shearing stops. Uncoated droplet 62 splits into two parts when it is subjected shear.

Figure 7:
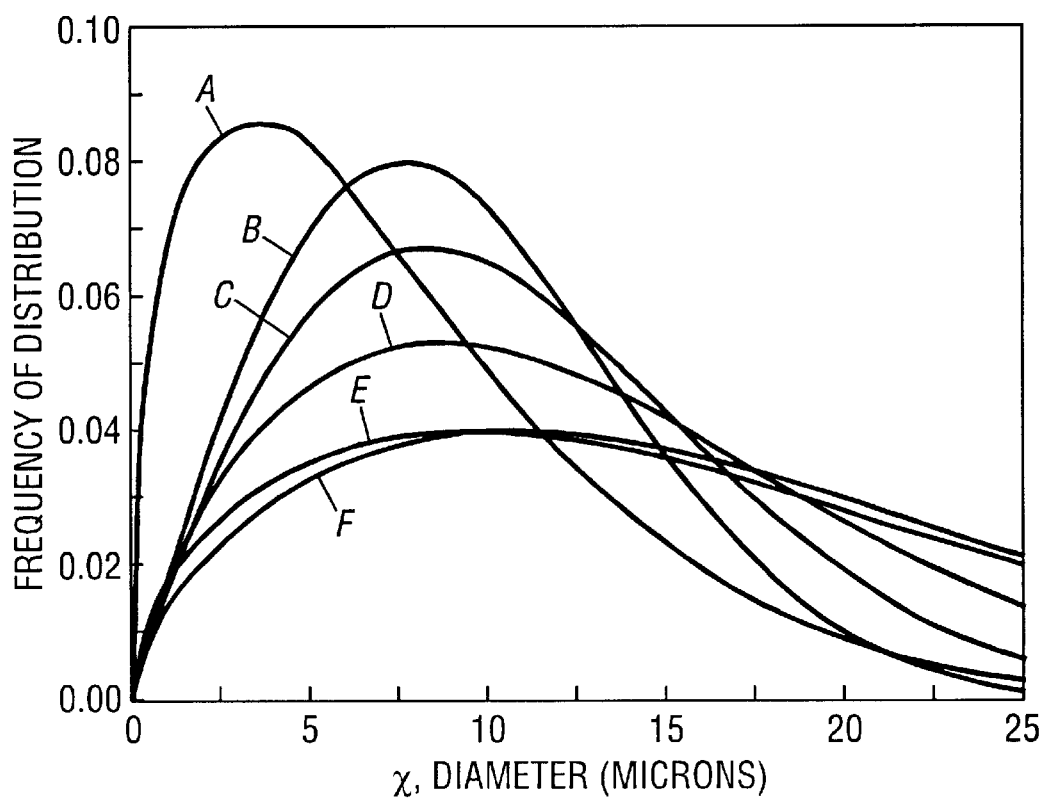
FIGS. 7–9 show frequency of distribution in relation to droplet size.
Figure 8:
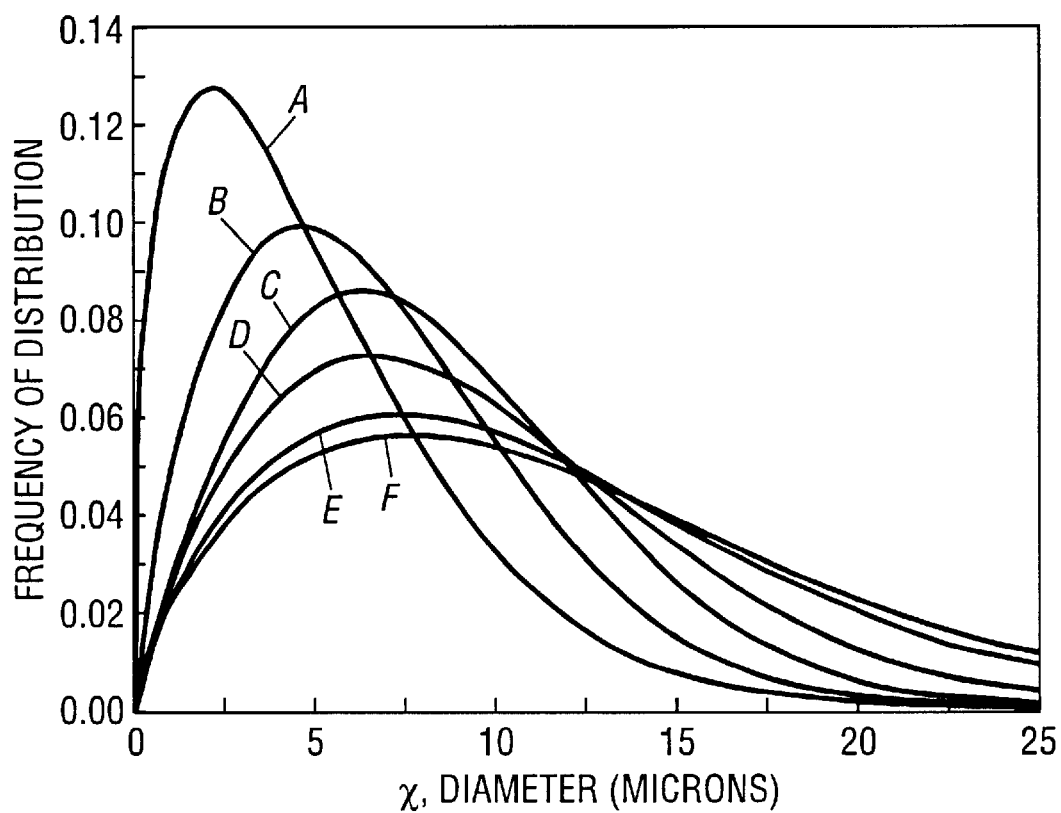
Figure 9:
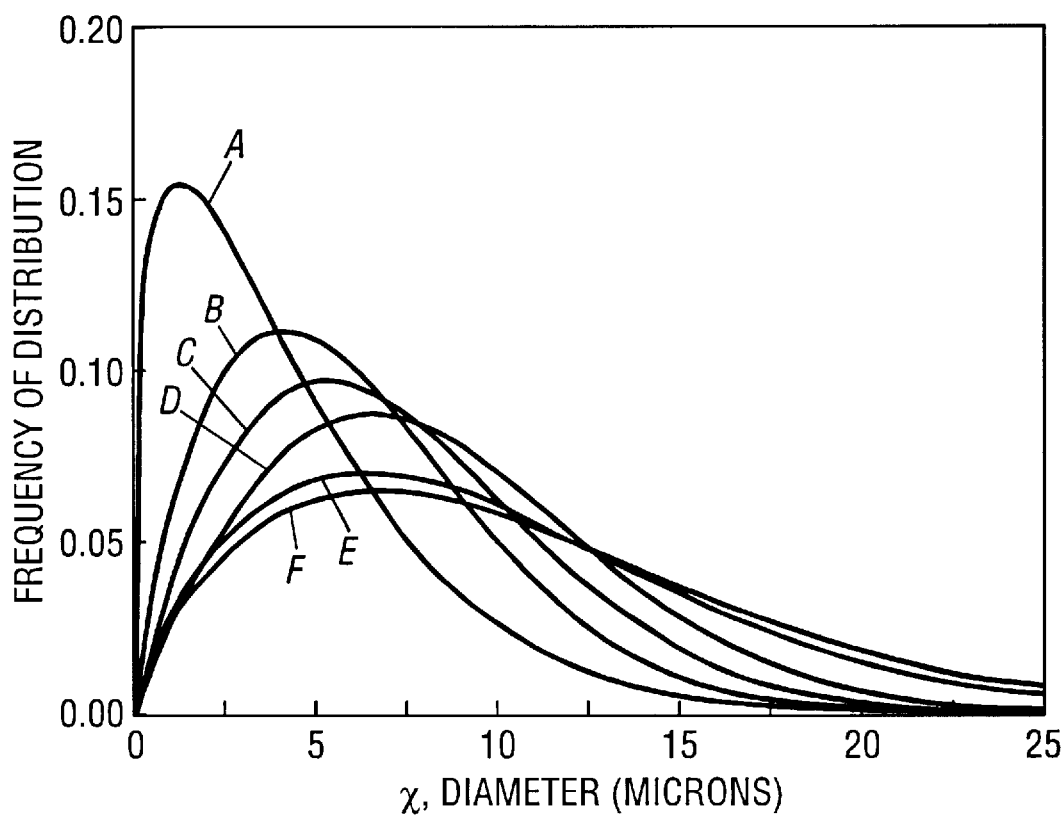

FIGS. 7–9 show plots of frequency of distribution versus particle size derived from treatment of solutions of polyisobutylene in crude oil condensate. Two types of polyisobutylene were used: PIB1 and PIB2 with two different molecular weights, the latter being the highest.

The solutions were tested by air-blast atomization at air velocities of 190 m/s, 230 m/s, and 270 m/s. In FIG. 7 the air velocity is 190 m/s, the fluid stress is 5400 pa. In FIG. 8 the air velocity is 230 m/s, the fluid stress is 12400 pa. In FIG. 9 the air velocity is 270 m/s and the fluid stress is 20800 pa. For all three figures curve A is for oil, curve B is for 0.125 g per liter of PIB1 in oil. Curve C is for 0.25 g per liter of PIB1 in oil. Curve D is for 0.5 g per liter of PIB1 in oil. Curve E is for 0.5 g per liter of PIB2 in oil, and curve F is for 1.0 g per liter of PIB1 in oil.

From this data it can be seen that PIB1 can effectively reduce misting of condensate even at the lowest polyisobutylene concentration tested. The use of a higher molecular weight polyisobutylene, PIB2, produced significantly better mist control than PIB1 at low air velocity (190 m/s) but the advantages of PIB2 relatively to PIB1 diminished considerably at high air velocity (270 m/s).

I claim:

1. A method for facilitating the removal of a hydrocarbon mist from a gaseous stream comprising mixing the mist in the gaseous stream with polyisbutylene to substantially prevent shearing of the mist to smaller particle sizes which are difficult to remove from the gaseous stream in separation apparatus.

2. The method of claim 1 wherein the agent is mixed with a diluent.

3. The method of claim 2 wherein the diluent is diesel oil and the mist is condensate.

4. The method of claim 1 wherein the agent is sprayed into the gaseous stream in a direction countercurrent to the flow of the gaseous stream for maximum contact.

5. The method of claim 4 wherein the agent is atomized by gas as it is sprayed through an elongated spray nozzle or the like having orifices pointed in said direction.

6. The method of claim 4 wherein the agent coats the surface of a scrubber, demister or coalescer which contacts the gaseous stream.

7. The method of claim 5 wherein the agent helps coalesce droplets in the gaseous stream by reducing drag on the surface of the scrubber, demister or coalescer.

8. The method of claim 1 wherein the agent is delivered with a mechanical atomizer.

9. The method of claim 1 wherein shearing of the mist to smaller particle sizes occurs in compression.

10. The method of claim 1 wherein shearing of the mist to smaller particle sizes occurs in flow of the mist through orifices.

11. The method of claim 1 wherein the separation apparatus is a coalescing filter.

12. The method of claim 1 wherein the separation apparatus is a scrubber or a demister vane or any other separation device.

13. The method of claim 1 wherein a production stream containing predominantly gas, some oil and hydrogen sulfide is sent to separation to remove substantially all of the oil, then treated with said agent to prevent shearing of the remaining oil to smaller particle sizes, and then scrubbed or filtered to remove the remaining oil before it is sent to treat the hydrogen sulfide in a process for oxidizing the sulfide to elemental sulfur.

14. The method of claim 1 wherein a gas plant stream containing predominantly gas and some liquid hydrocarbons is passed to a separator wherein a substantial majority of the liquid hydrocarbon is separated from the gas, adding said agent to the gas, and then removing substantially all of the liquid hydrocarbon from the gas, and passing the gas to treatment by other processes which are normally sensitive to the presence of hydrocarbons.

15. The method of claim 1 wherein a production stream from a well containing oil and gas is passed to a separator to remove most of the oil, adding said agent to the gas and then removing substantially all of the oil from the gas and passing the gas to a glycol contractor for drying.

16. The method of claim 1 wherein the agent polyisobutylene acts as a drag reducer for the impinging droplets on surfaces.

17. The method of claim 1 wherein said agent is sprayed upstream of compressor stations to prevent the fouling and erosion of the compressor blades.

\* \* \* \* \*